Aug. 22, 1944.　　　R. L. HAYMAN　　　2,356,318
CONDUIT SUPPORT
Filed April 13, 1942

INVENTOR.
Richard L. Hayman,
BY Robert W. Fulwider
ATTORNEY.

Patented Aug. 22, 1944

2,356,318

UNITED STATES PATENT OFFICE 2,356,318

CONDUIT SUPPPORT

Richard Lowell Hayman, North Hollywood, Calif.

Application April 13, 1942, Serial No. 438,735

3 Claims. (Cl. 24—135)

This invention relates to improvements in devices for reliably supporting and securing conduits in aircraft and other vehicles and protecting the lines from injury due to vibration.

Apparatus heretofore devised to secure and insulate the conduits of aircraft against vibration have been found ineffective to protect the lines from deterioration and have been expensive to make and install. The most widely used types in aircraft have either employed a flexible metal strap encircling the line with a rubber cushion between the strap and the line, or have utilized resilient blocks through which the lines were extended.

The metal straps or clips are not particularly satisfactory because it takes a separate clip for each conduit, which means a considerable expenditure of time in installation and very inefficient use of materials. Furthermore, it is impossible to position the conduits as close together as needed. The full resilient blocks now generally used are likewise very wasteful of essential materials, unduly heavy and very expensive to manufacture. In addition, there is a distinct disadvantage in having the conduits embedded or supported by a relatively large mass of rubber or other cushioning material.

The present invention has for its immediate objects: the provision of a conduit support of simple and practical construction, consisting of complemental clamping blocks of wood or other suitable rigid or non-resilient material having conduit receiving seats formed in their opposing faces to provide a stable and readily adaptable base for the conduits; the provision of resilient shock-absorbing grommets of rubber or equivalent cushioning material lining the seats to depths sufficient to stabilize the lines and to efficiently absorb and neutralize the vibrations communicated thereto; and the provision of cushioning grommets molded to correspond to the contours of the conduit receiving seats formed in the respective blocks and provided with integral clamping parts whereby the grommets are secured and retained in the seats of the several blocks without risk of displacement.

Another object of my invention is to provide a conduit clamping block which is much cheaper to construct and lighter in weight than ones heretofore on the market, and which can be easily modified to meet specific problems as they arise without great additional expense.

Figure 1:
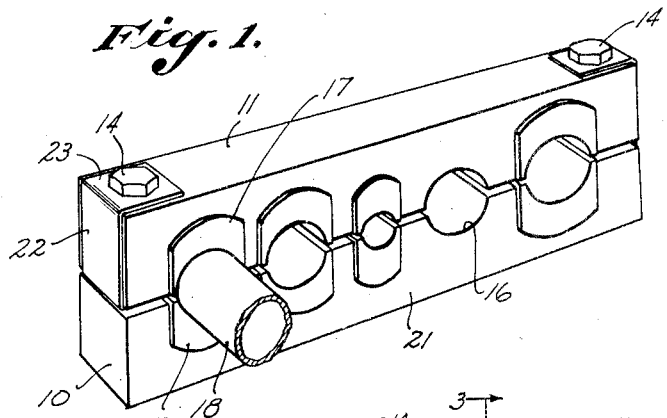
Figure 2:
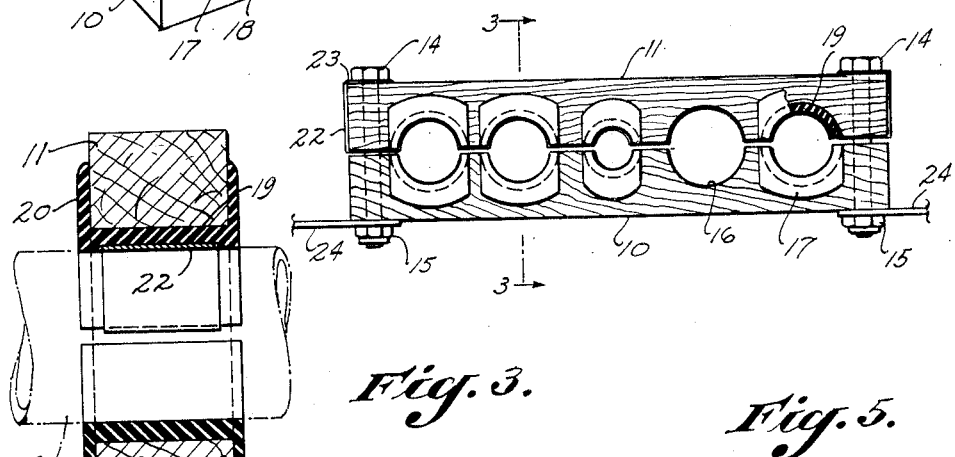
Figure 3:
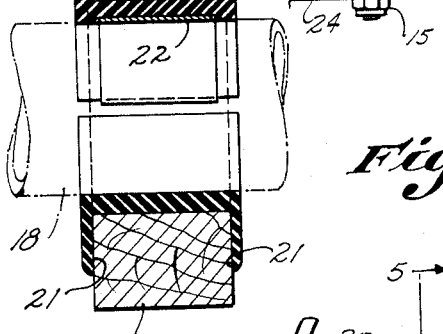
Figures 4, 5:
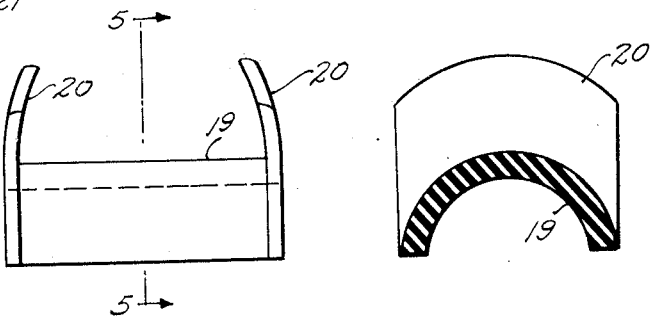

Other objects and advantages of my invention and objects relating to details of construction and arrangements of parts will appear from the detailed description to follow:

The accompanying drawing illustrates by way of example a representative form of my invention, in which:

Fig. 1 is a perspective view of a conduit clamping device embodying my invention, Fig. 2 is a view in elevation of the same, partly broken away, Fig. 3 is an enlarged view in vertical section taken on line 3—3 of Fig. 2, Fig. 4 is a detached view in side elevation of a grommet element of the invention, and Fig. 5 is a view in cross section taken on line 5—5 of Fig. 4.

Referring now then to the drawing wherein similar reference characters denote like parts in the several views. The reference numerals 10 and 11 indicate, respectively, the lower and upper complemental blocks of my improved clamping device. Said blocks may be formed of any suitable rigid material, of which wood is probably the most desirable as being readily formed and low in cost. The non-resilient blocks are formed with vertical bores adjacent their opposite ends to receive bolts 14 extending through the registering bores at each end and retaining the blocks in superposed relation. Nuts 15 threaded upon the lower protruding ends of the bolts provide means to clamp the blocks together.

Conduit receiving seats 16 which are preferably semi-cylindrical in shape are formed at intervals transversely across the blocks on their opposing faces, and each pair of opposing seats is provided with similarly shaped resilient linings or grommet sections 17, whose internal diameters are approximately the same as the external diameters of the respective lines 18 to be seated therein. The grommet sections are formed of rubber or other resilient material and each section comprises an arcuate body portion 19 forming the aforesaid lining for a seat 16 and integrally molded flanges 20 at each end of the body portion, extending substantially at right angles from the curved opening in the body to bear in close contact upon the lateral faces 21 of the block. In the process of molding, the flanges 20 are preferably deflected inwardly from the vertical by a slight amount, see Fig. 4, so that in mounting the grommets upon the blocks the flanges must be sprung outwardly to admit of the insertion of the bodies within the seats. When the flanges are released, they will spring inwardly into close engagement with the side faces 21 of the block, as shown in Fig. 3. Thus with the grommet sections 17 fitted snugly within the conduit receiving seats and the flanges 20 thereof in engagement with the block sides, the grommets will be firmly seated in place.

A light application of cement may be utilized between the seats and the grommet bodies, if desired, but the adhesion therebetween due to the gripping action of the flanges 20 against the side walls will ordinarily be sufficient to maintain the grommet sections in operative condition and permit manipulation of the separate blocks without dipslacement of the grommets seated therein.

In the assembly and mounting of my improved conduit supporting devices, each pair of clamping blocks 10 and 11 is prepared by the placement within each of its several line seats of a cushioning grommet section 17. The block 10 is then positioned upon one side of a parallel series of lines 18 with each grommet section receiving therein the line for which it was prepared. The complemental block 11 is then similarly positioned on the opposite side of the lines with its grommets engaging the proper lines. The bolts 14 may then be inserted in the registering bores of the blocks and the nuts 15 applied and tightened to draw the block together and clamp the lines therebetween with the desired compression of the grommets in which the lines are cushioned. Adjustments of the clamping blocks longitudinally of the conduits may be readily made without unduly loosening the bolts and without displacement of the grommets from their normal position within the line seats by reason of the external engagement of the flanges 20 with the clamp blocks.

To safeguard the lines secured by said clamping devices from the accumulation of static electricity, certain or all of the pairs of clamp blocks securing the lines are provided with a metal conductor strip 22 associated with the upper block 11 and secured at its opposite ends, as at 23, under the heads of the respective bolts 14, whence its intermediate portion under the lower edge of said block and is flexed about the inner surfaces of the respective grommet bodies 19, where it is in direct contact with the several lines. Discharge from said conductor strip is directed through the bolts 14 to grounded conductors 24 secured to the opposite ends of the bolts.

It will be apparent that the present invention provides an efficient support for the lines installed in aircraft or other vehicles by securing them firmly by means of non-resilient blocks to avoid displacement and to dampen any destructive vibration that may be communicated thereto through the vehicle frame. Cushioning grommets lining the seats in which the lines are received in the clamping blocks are designed in sufficient thickness of materials to further dampen and absorb any vibrations to which the retained lines are subjected. The minimum employment of rubber as a cushioning material for the lines is an advantageous factor in the invention in that it conserves a material whose supply is reduced and is becoming vitally necessary in other branches of defense work, and also in that by surrounding and cushioning the lines with only such relatively reduced thicknesses of the shock-absorbing material as, embodied in the grommet sections 17, the vibrations are similarly minimized and confined, while in the employment of thicker bodies of cushioning material, the displacement of the lines caused by vibration will be increased in proportion to such thickness over the required minimum.

A further advantage in the employment of a rigid non-resilient block in my invention resides in the fact that no additional supporting or backing means is needed for the block as is necessary where resilient blocks are used for this purpose.

The grommet sections adapt themselves for placement within the conduit receiving seats as substantially integral parts of the blocks to facilitate the assembly of the clamp and maintain the lines therein as well as for taking apart for inspection or repair. The positive connection of the grommet sections with the blocks is assured without the aid of adhesives by the provision of the integral flanges 20 engaging the side surfaces of the clamp blocks. Such engagement of the flanges against the blocks allows longitudinal movements and adjustments of the lines within the grommets without the displacement of the grommets from their operative positions within the seats.

While I have shown a particular form of my invention in detail, it will be understood that it is merely illustrative of the broad scope of my invention as defined by the appended claims, and that various modifications can be made within the scope thereof.

I claim:

1. A conduit support consisting of: a pair of separate opposed nonresilient blocks, provided with a plurality of complemental conduit receiving seats in their opposed faces; individual resilient grommet sections in each of said seats, the opposed grommet sections cooperating to receive and cushion a conduit therebetween; and means for holding said blocks together to clamp said conduits between said grommet-lined seats.

2. A conduit support consisting of: a pair of separate opposed wood blocks, provided with a plurality of complemental conduit receiving seats in their opposed faces; individual resilient grommet sections in each of said seats, the opposed grommet sections cooperating to receive and cushion a conduit therebetween; and bolts at each end of said blocks for holding said blocks together in parallel spaced relationship to clamp said conduits between said grommet-lined seats.

3. A conduit support consisting of: a pair of separate opposed nonresilient blocks each provided with a plurality of spaced, substantially semi-cylindrical conduit receiving seats in their opposed faces; individual resilient substantially semicylindrical grommet sections of substantially uniform thickness and cross-section in each of said seats, the outer edges of said grommets being substantially flush with the side faces of said blocks, the opposed grommet sections cooperating to receive and cushion a conduit therebetween; and bolts adjacent the opposite ends of said blocks and extending therethrough for holding said blocks together to clamp said conduits between said grommet-lined seats with the opposed faces of said blocks slightly spaced from each other in substantially parallel relation.

RICHARD LOWELL HAYMAN.